United States Patent
Sommer et al.

(10) Patent No.: US 10,536,363 B2
(45) Date of Patent: Jan. 14, 2020

(54) SYNTHETIC TESTING OF WEB APPLICATIONS USING INSTRUMENTED MONITORING AGENTS

(71) Applicant: Dynatrace LLC, Waltham, MA (US)

(72) Inventors: Alexander Sommer, Neumarkt Im Muehlkreis (AT); Alexander Francoeur, West Newbury, MA (US); Jianbo Tang, Acton, MA (US); Jason Wu, Woburn, MA (US); Paul Anastas, Needham, MA (US); Simon Schatka, Linz (AT); Ernst Ambichl, Altenberg (AT)

(73) Assignee: Dynatrace LLC, Waltham, MA (US)

( * ) Notice: Subject to any disclaimer, the term of this patent is extended or adjusted under 35 U.S.C. 154(b) by 511 days.

(21) Appl. No.: 15/157,883

(22) Filed: May 18, 2016

(65) Prior Publication Data
US 2017/0339042 A1 Nov. 23, 2017

(51) Int. Cl.
H04L 12/26 (2006.01)
H04L 29/08 (2006.01)
H04L 12/24 (2006.01)

(52) U.S. Cl.
CPC .............. *H04L 43/50* (2013.01); *H04L 43/12* (2013.01); *H04L 67/02* (2013.01); *H04L 41/0253* (2013.01); *H04L 41/046* (2013.01); *H04L 43/08* (2013.01); *H04L 67/22* (2013.01)

(58) Field of Classification Search
CPC ....... G05B 2219/32134; G06F 11/3668; G06F 11/3688; H04L 67/42; H04L 29/0809; H04N 21/4782
See application file for complete search history.

(56) References Cited

U.S. PATENT DOCUMENTS

| | | | | |
|---|---|---|---|---|
| 5,218,605 A | * | 6/1993 | Low | G06F 11/2273 714/45 |
| 8,065,410 B1 | * | 11/2011 | Breen | H04L 67/025 702/182 |
| 8,826,084 B1 | * | 9/2014 | Gauf | G06F 11/3688 714/32 |
| 9,703,693 B1 | * | 7/2017 | Pasupuleti | G06F 11/3692 |
| 2011/0131450 A1 | * | 6/2011 | Wheeler | G06F 11/3688 714/32 |
| 2012/0226940 A1 | * | 9/2012 | Lin | G06F 11/263 714/26 |

(Continued)

*Primary Examiner* — Aftab N. Khan
(74) *Attorney, Agent, or Firm* — Harness, Dickey & Pierce, P.L.C.

(57) ABSTRACT

A computer-implemented system is provided that enables synthetic testing of web applications using monitoring agents instrumented in web content. A playback engine is configured to receive a test script for testing a given web page and initiates loading of the given web page by a web browser. A monitoring agent has a tag embedded into a document object model of the given web page and is a script defined in accordance with the scripting language. During playback of the test script by the playback agent, the monitoring agent determines a performance metric for the given web page. A wait agent has a tag embedded into the markup language of the given web page. During building of the document object model for the given web page, operates to inject the tag for the monitoring agent into the document object model for the given web page.

13 Claims, 7 Drawing Sheets

(56) References Cited

U.S. PATENT DOCUMENTS

2014/0089904 A1\* 3/2014 Wray ................... G06F 11/3672
　　　　　　　　　　　　　　　　　　　　　　717/135
2015/0186249 A1\* 7/2015 Miller ................. G06F 11/3688
　　　　　　　　　　　　　　　　　　　　　　717/127

\* cited by examiner

SYNTHETIC TESTING OF WEB APPLICATIONS USING INSTRUMENTED MONITORING AGENTS

FIELD

The present disclosure relates to synthetic testing of web applications using monitoring agents instrumented in web content.

BACKGROUND

Typically, real user tracking and monitoring of web applications is accomplished by embedding monitoring agents into web pages. During navigation of a web page, the monitoring agent captures performance metrics related to the web page and sends data back to a server for analysis and reporting. On the other hand, synthetic testing tools rely on customization of a user's web browser to capture performance metrics related to web pages. Because the collection mechanisms differ between real user monitoring and synthetic testing, the data collected differs and cannot be easily compared.

Therefore, it is desirable to develop a technique for synthetic testing of web applications which results in performance metrics that are the same as the performance metrics collected in real user monitoring and collected in the same manner as the performance metrics collected in real user monitoring.

This section provides background information related to the present disclosure which is not necessarily prior art.

SUMMARY

This section provides a general summary of the disclosure, and is not a comprehensive disclosure of its full scope or all of its features.

A computer-implemented system is provided that enables automated testing of web applications operating within a web browser. The computer-implemented system includes a playback agent, a monitoring agent, and a wait agent. The playback engine is configured to receive a test script for testing a given web page and initiates loading of the web page by a web browser, where the test script includes a plurality of actions for testing the given web page and is defined in accordance with a scripting language. The playback engine is implemented as a browser extension of the web browser and executed by a processor of a host computing device. The monitoring agent has a tag embedded into a document object model of the given web page and is a script defined in accordance with the scripting language. During playback of the test script by the playback agent, the monitoring agent determines a performance metric for the given web page. The wait agent has a tag embedded into the markup language of the given web page and, during building of the document object model for the given web page, operates to inject the tag for the monitoring agent into the document object model for the given web page. The wait agent is also a script defined in accordance with the scripting language and is executed by the processor of the host computing device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
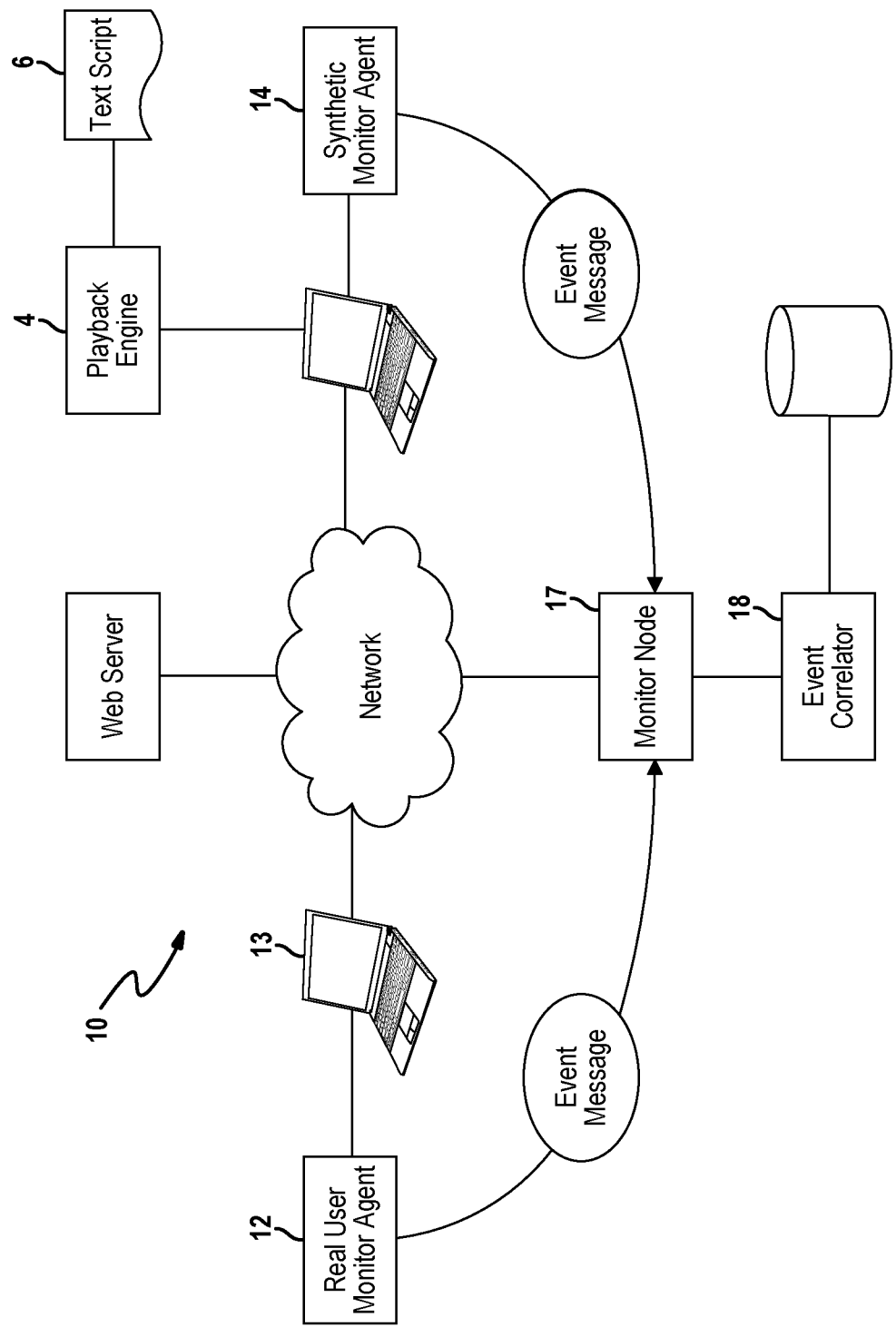
FIG. 1 depicts an example performance monitoring system.

FIG. 1 depicts an example performance monitoring system 10. The performance monitoring system 10 supports real time user monitoring as well as synthetic testing and monitoring. For real user monitoring, a real user monitoring agent 12 is injected into the web pages being accessed by a user. While a user navigates an instrumented web page, the monitoring agent 12 is executed on the host computing device 13. The monitoring agent 12 operates to determine performance metrics for the web page during the user interaction. The performance metrics may be tagged with correlation data that enables identification of transaction executions corresponding to the metrics. The tagged performance metrics are in turn sent via event messages to an event correlator 18, where the event correlator resides on a monitoring node 17 located remotely via a network from the host computing device 13. Further information regarding such real user monitoring agents may be found in U.S. Pat. No. 8,234,631 which is incorporated by reference in its entirety herein.

Synthetic testing involves creation and execution of a test script. The test script is created as a user navigates through a web application. During navigation, a recorder captures each of the actions taken by the user and stores the captured sequence of actions as a test script for later testing. For synthetic testing and monitoring, the test script 6 is executed by a playback engine 4. During loading of the web page under test, a synthetic monitoring agent 14 is injected into the content of the web page under test by the playback engine 4 as will be further described below. During playback of the test script 6, the synthetic monitoring agent 14 determines performance metrics for the web page. Likewise, performance metrics are tagged with correlation data and sent via event messages to the event correlator 18. From the tagged performance metrics, the event correlator 18 creates end-to-end transaction data describing execution and performance of individual transactions. An exemplary correlation process is further described in U.S. Pat. No. 8,234,631 which is incorporated by reference in its entirety herein.

Figure 2:
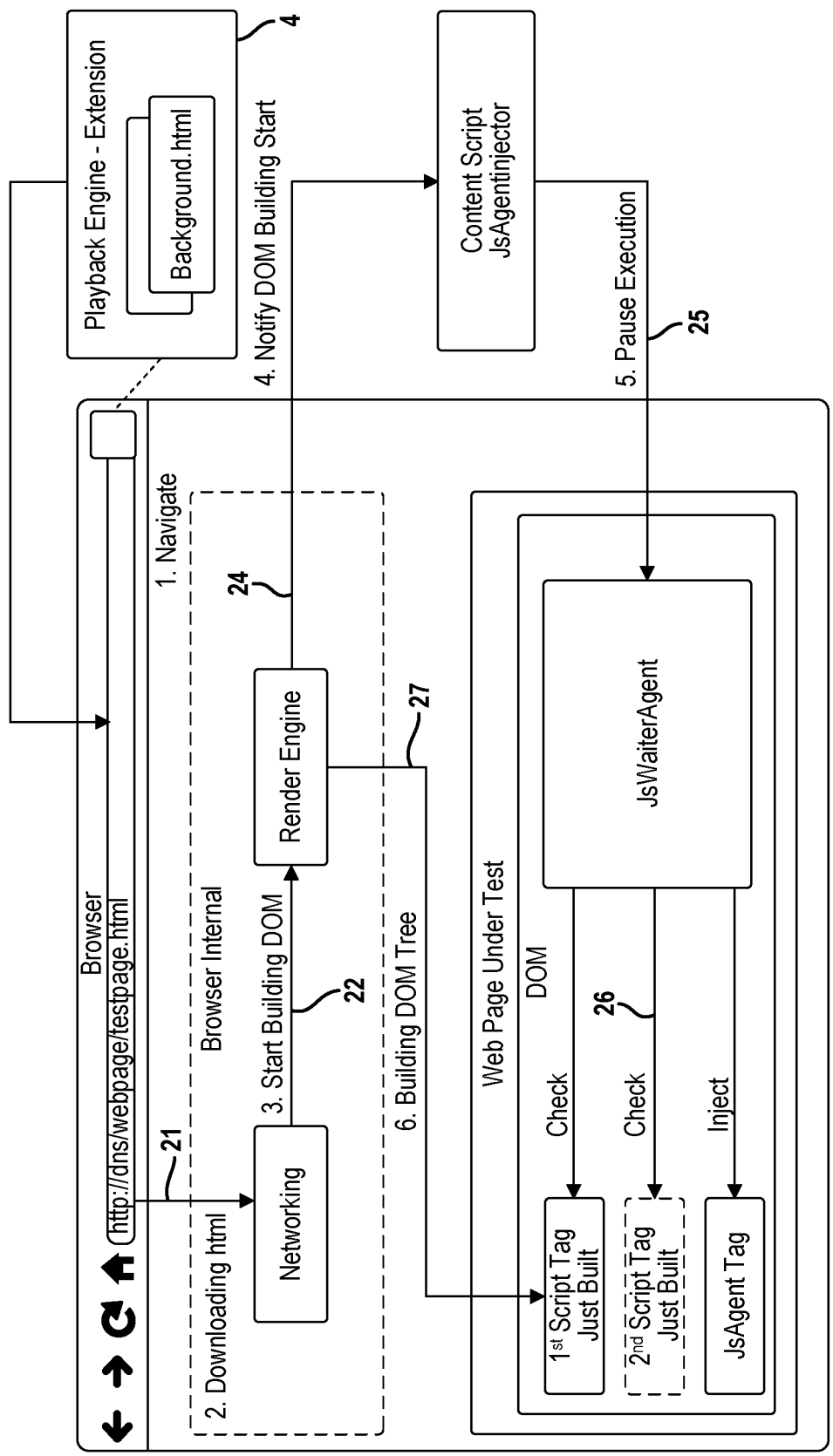
FIG. 2 is a block diagram illustrating a process for injecting a synthetic monitoring agent into a web page under test.
Figure 3:
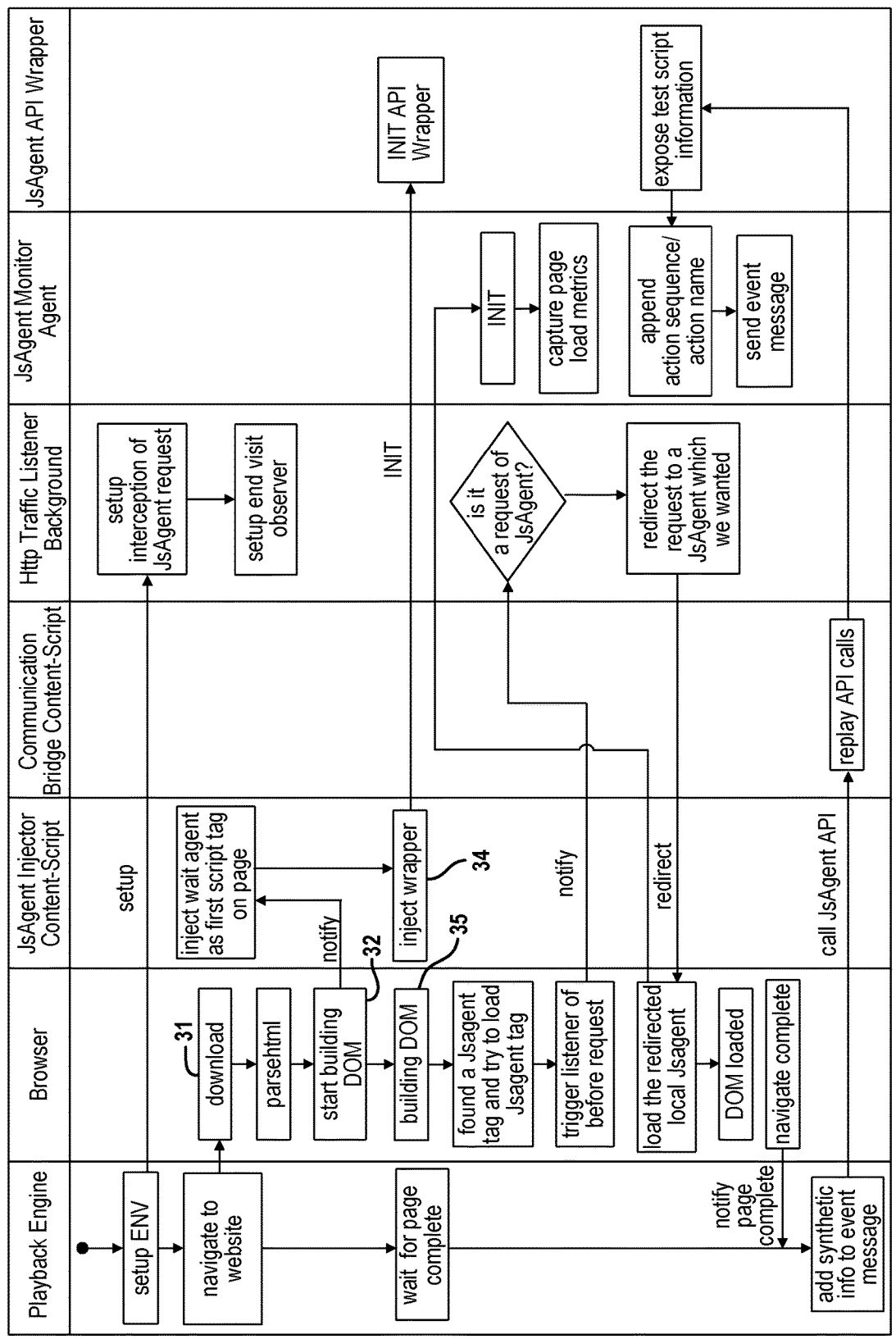
FIG. 3 is a diagram further illustrating the process for injecting the synthetic monitoring agent.

FIGS. 2 and 3 further describe the process for injecting a synthetic monitoring agent into a web page under test. In FIG. 2, a playback agent 4 executes the actions set forth in the test script. In the example embodiment, the playback agent 4 is implemented as a browser extension of the web page under test.

When a given action from the test script 6 calls for a new web page to be loaded, the playback engine 4 interacts with a web browser 2 on the host computing device to load the web page. Specifically, the network component of the web browser begins downloading the HTML content at 21 from the web server and the render engine of the web browser starts to build the document object model (DOM) at 22. An injector agent 23 is notified at 24 by the render engine that the DOM building has begun. The injector agent 23 can receive such notification for example, by registering with an event listener of the web page. In the example embodiment, the injector agent 23 is implemented as JavaScript files that run in the context of the web page under test (e.g., a content script in a Chrome web browser). Techniques for starting execution of Javascript files which comprise the injector agent by a browser extension, such as the playback engine, during the building of the document object model are readily known in the art.

In response to receiving a notification from the render engine, the injector agent 23 pauses execution of the other components (e.g., Javascripts) embedded in the web page under test as indicated at 25 and injects a script tag for the monitoring agent into the DOM as indicated at 26. These steps are described in more detail below in connection with FIG. 3. Concurrently therewith, the render engine builds the DOM for the web page under test as indicated at 27. Once the script tag for the monitoring agent has been injected into the DOM (along with a few other configuration steps), execution resumes for the other components embedded in the web page. By placing script tag for the monitoring agent first, the monitoring agent is ensured to be loaded and executed prior to the remaining components found in the web page under test. It is understood that only the relevant steps of this feature are discussed in relation to FIG. 2 but that other processor instructions may be needed to control and manage the synthetic testing process.

Referring to FIG. 3, the integration of a synthetic monitoring agent into content of a web page under test is shown in more detail. The playback engine 4 executes the actions set forth in the test script 6. When a given action calls for a new web page to be loaded, the playback engine 4 interacts with web browser to begin loading the web page. The web browser first retrieves the HTML content for the web page under test from the web server at 31 and begins building the document object model for the web page at 32. The web browser also notifies an injector agent that the DOM building has begun. Of note, the injector agent injects a wrapper application programming interface (API) at 34 into the DOM as well. The wrapper API will be made available when the web page loads and is further described below.

Figure 4:
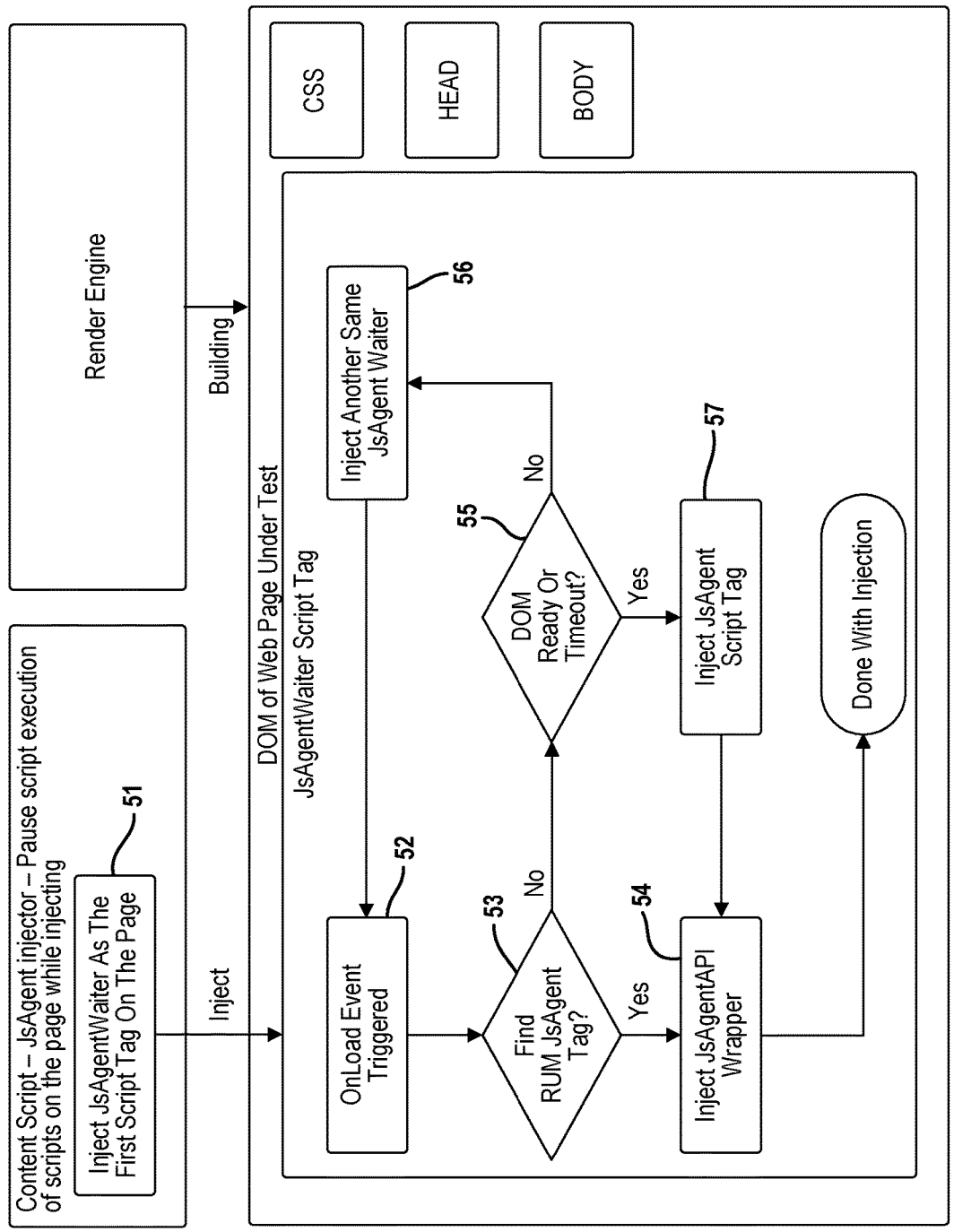
FIG. 4 is a block diagram depicting an example embodiment for a wait agent.

Steps taken to inject a synthetic monitoring agent are further described below in FIG. 4. First, the injector agent injects a script tag for a wait agent at 51 as the first script tag on the web page. In an example embodiment, the wait agent is a Javascript that is executed immediately after the wait script tag has been loaded, for example using an onLoad event. Other techniques for initiating execution of the wait agent are also contemplated by this disclosure.

During execution, the wait agent checks at 53 for a script tag for a real user monitoring agent. Pseudocode for checking for a script tag in the example embodiment is as follows.

```
function isRumTag(scriptTag) {
   if (scriptTag && scriptTag.getAttribute('data-dtconfig')) {
      return true;
   }
   //ruxit-jsagent bootstrap
   if (scriptTag && scriptTag.getAttribute('src') &&
   isRuxitJsagentBootstrap(scriptTag.getAttribute('src'))) {
      return true;
   }
   return false;
}
function isRuxitJsagentBootstrap(scriptSrc) {
   if (!scriptSrc) { return false; }
      var ruxitJsBootStrapPattern =
   /^(http:|https:)?\/\/js\.[^\/]*\/jstagV[^\/]*V[^\/]*V[^\/]*_bs.js$/ig;
   return ruxitJsBootStrapPattern.test(scriptSrc);
}
```

In some instances, the content for the web page under test may already be instrumented with real user monitoring agent, for example if the content provider is a current customer. In these instances, there is no need to inject a synthetic monitoring agent. The wait agent concludes by injecting a script tag at 54 for the wrapper API in the document object model.

Alternatively, the wait agent may elect to replace the real user agent with a synthetic version of the corresponding monitoring agent before injecting a script tag for the wrapper API. The synthetic version of the monitoring agent has substantially the same functionality as the corresponding real user monitoring agent with some additional functions. For example, a real user monitoring agent cannot capture a statusCode for an individual http object because of limitations in the W3C metric specification. The synthetic monitoring agent, however, can be configured to capture a statusCode for an individual http object and send such information to the correlation engine. Other examples of supplemental data that may be captured by the synthetic monitoring agent are contemplated by this disclosure. Otherwise, the synthetic monitoring agent is configured to capture the same performance metrics as the corresponding real user monitoring agent.

In the event that no real user monitoring agent is found, the wait agent determines at 55 whether the building of the DOM is ongoing or otherwise timed out. Another script tag for the wait agent is injected at 56 into the document object model in response to a determination that the building of the DOM is ongoing. In this way, script execution is paused while the wait agent waits to see if the web page under test is instrumented with a real user monitoring agent. This process is repeated until either a real user monitoring agent is discovered or the building of the DOM is compete or otherwise timed out.

In the event that the DOM is built or otherwise times out without discovery of a real user monitoring agent, then the wait agent will inject a script tag for a synthetic monitoring agent into the document object model of the web page under test as indicated at 57. Additionally, the wait agent will inject a script tag for the wrapper API in the document object model of the web page under test as indicated at 44. As a result, the content of the web page under test has been instrumented with a monitoring agent that can capture performance metrics during execution of a test script by the playback engine.

Returning to FIG. 3, the browser continues at 35 to build the DOM until it is completely loaded. In some instances, the web page under test may already be instrumented with a real user monitoring agent. Upon detecting a script tag for a real user monitoring agent, the browser starts an HTTP traffic listener at 36 to monitor for the loading of the real user monitoring agent. In this example, a real user monitoring agent can be identified by a unique string in the tag. Pseudocode for checking the URL to determine if it is a request for a real user monitoring agent is as follows.

```
/ ** example urls injected by bootstrap module
 *
 https://js.ruxit.com/jstag/145e12d594f/
 ruxitagentjs__crgix__10076150724090829.js
 *
 https://js.ruxitlabs.com/jstag/1468ae7109d/
 ruxitagent__rg__10078150818123720.js
 *
 http://js.ruxitlabs.com/jstag/1468ae7109d/
 ruxitagent__crgi3x__10078150814180116.js
 *
 * @param url
 * @returns {boolean}
 */
function isRuxitTagUrl(url) {
    var rumTagPattern = /dtagent[^?]*_[^?]*_[^?]*.js/ig;
    var ruxitTagPattern = /ruxitagentjs[^?]*_[^?]*_[^?]*.js/ig;
    var ruxitTagExtPattern = /ruxitagent[^?]*_[^?]*_[^?]*.js/ig;
    var dtTagDebugPattern = /dtagentdbg[^?]*_[^?]*_[^?]*.js/ig;
    return rumTagPattern.test(url) || ruxitTagPattern.test(url) ||
        dtTagDebugPattern.test(url) || ruxitTagExtPattern.test(url);
}
```

Downloading of requests are then intercepted by the HTTP traffic listener. For a downloading request of a real user monitoring agent, the HTTP traffic listener is configured to redirect the request at 37 to a synthetic monitoring agent in the playback engine. In this way, the synthetic monitoring agent can be loaded in place of the real user monitoring agent instrumented in the web page under test.

Once the DOM has been built and the web page has been loaded, the web browser notifies the playback engine 4 as indicated at 41. In response to receiving this notification, the playback engine 4 communicates information about the synthetic testing process to the synthetic monitoring agent for subsequent use. Because messages cannot be sent directly from a browser extension, such as the playback engine, to the web page, the wrapper API is used as an intermediary to deliver the information to the monitoring agent.

Figure 5:
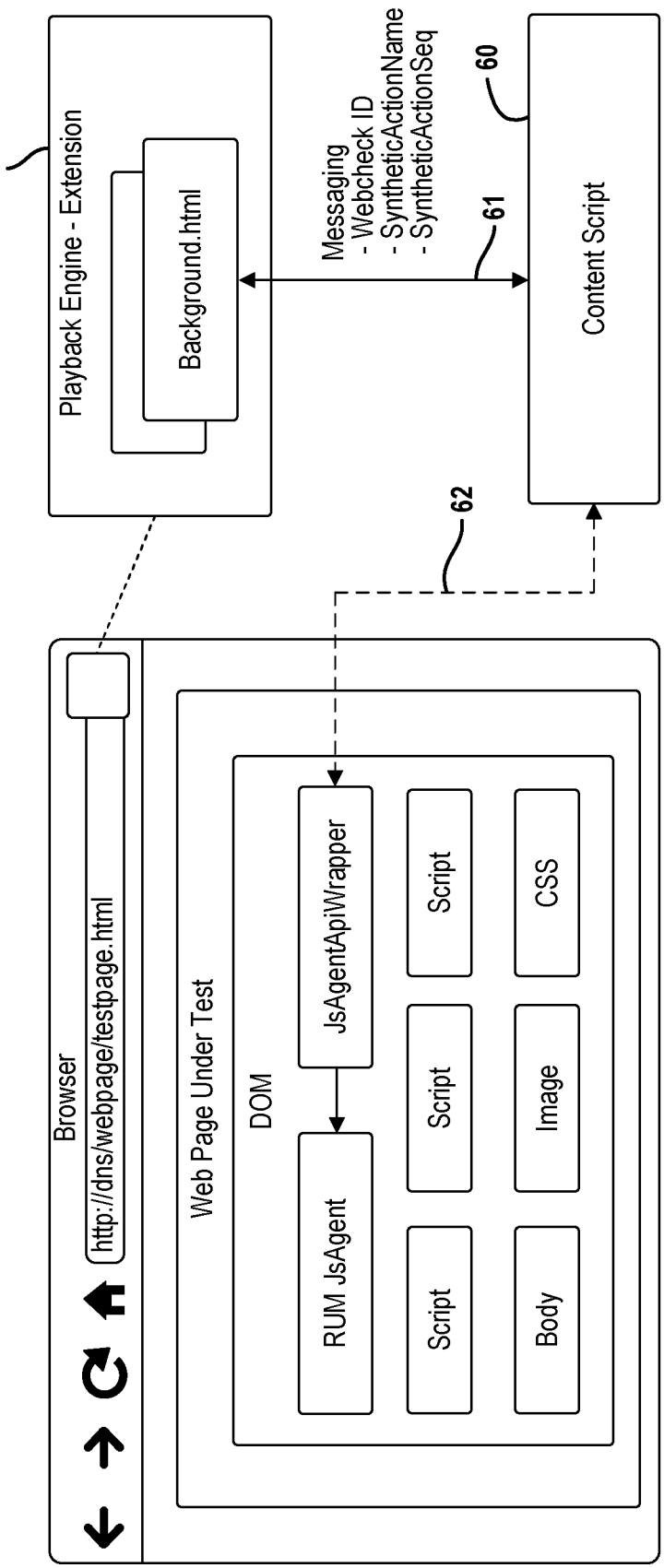
FIG. 5 is a block diagram illustrating how information about the synthetic testing process is communicated to a monitoring agent.

FIG. 5 further illustrates how information about the synthetic testing process is communicated to the synthetic monitoring agent. Information is first passed at 61 from the playback engine 4 to a content script 60 (i.e., JavaScript files that run in the context of web pages). Identifying information for the synthetic testing process may include but is not limited to a script identifier, name for the current script action and a sequence number of the current script action. Such information may be passed, for example via messages supported by the web browser.

The content script 60 can then pass the information at 62 to the web page using the shared DOM. More specifically, the wrapper API 64 can listen for and receive particular DOM events. When the content script updates the DOM with the identifying information for the synthetic testing process, the wrapper API 64 is notified. The wrapper API 64 in turn pushes the identifying information to the synthetic monitoring agent. In the example embodiment, the wrapper API 64 and the synthetic monitoring agent 14 are in the same web page. Hence, the wrapper API 64 can access a method exposed by the synthetic monitoring agent 14 to update a data store which stores the identifying information for the synthetic testing process.

The synthetic monitoring agent 14 appends the identifying information for the synthetic testing process to any of the event messages sent to the correlation engine 18. In one embodiment, the synthetic monitoring agent 14 maintains a data store (e.g., array) of data which may be appended to an outgoing event message. Upon receipt of the identifying information from the wrapper API, the synthetic monitoring agent 14 updates the corresponding information in the data store. In this way, the most current identifying information for the synthetic testing process is maintained and accessible to be appended to an outgoing event message.

Figure 6:
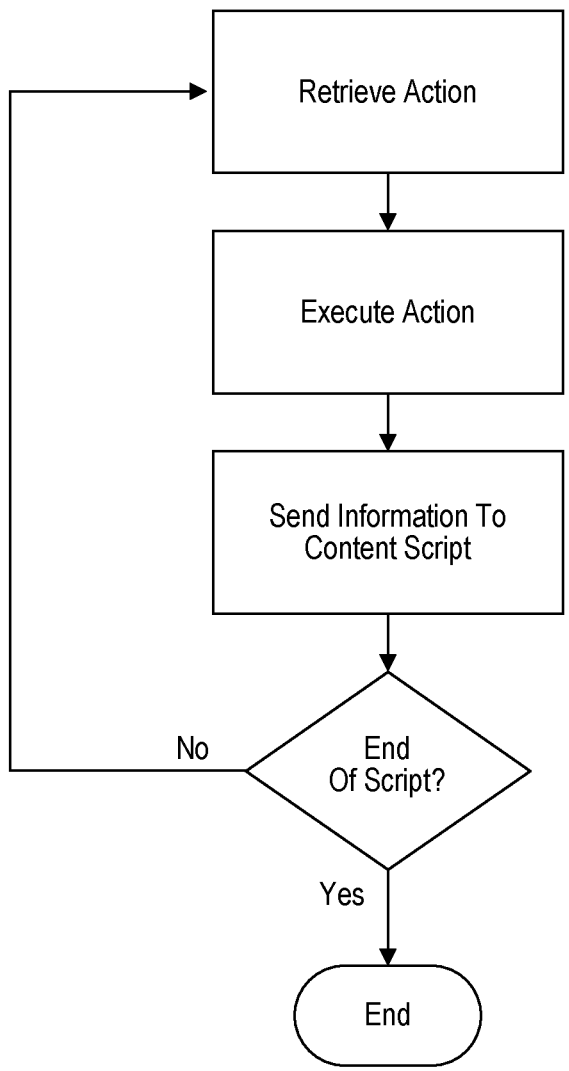
FIG. 6 is a flowchart for steps taken by an example playback engine.

In a similar manner, playback engine 4 is configured to communicate information about the synthetic testing process to the synthetic monitoring agent through the execution of the test script. Referring to FIG. 6, the playback engine retrieves a given action from a test script as indicated at 71 and in turn executes the given action as indicated at 72. For each executed action, identifying information for the test script and the given action are sent at 73 to the content script. Such information is passed along to the synthetic monitoring agent in the same manner as described in FIG. 5. The playback engine can then check for another action in the test script and repeat the process. Playback ends once all of the actions have been retrieved and executed by the playback engine. It is understood that only the relevant steps are discussed in relation to FIG. 6 but that other processor instructions may be needed to implement the playback engine.

Figure 7:
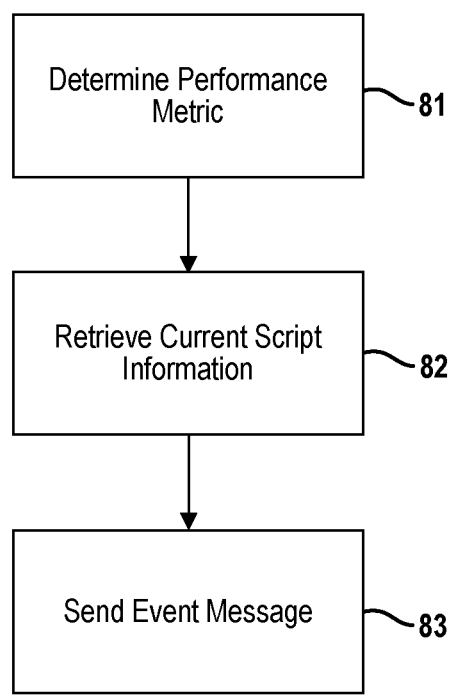
FIG. 7 is a flowchart for steps taken by an example monitoring agent.

During script execution by the playback engine, the synthetic monitoring agent will monitor performance of the web page under test as seen in FIG. 7. That is, the synthetic monitoring agent will monitor and determine performance metrics and other data associated with the execution of the web page. Example performance metrics include but are not limited to DNS lookup time, number of bytes, action duration, etc. Before sending an event message to the correlation engine, the synthetic monitoring agent 14 retrieves identifying information for the synthetic testing process from a data store maintained by the synthetic monitoring agent 14. The data store is updated and maintained via the wrapper API 64 as described above in relation to FIG. 5. The identifying information for the synthetic testing process is then appended to an outgoing event message. An event message is sent by the synthetic monitoring agent at 83 to the correlation engine 18. It is understood that only the relevant steps of this feature are discussed in relation to FIG. 7 but that other processor instructions may be needed to implement the monitoring agent. Further details regarding an example monitoring agent may be found in U.S. Pat. No. 8,151,277 which is incorporated by reference in its entirety herein.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented system that enables automated testing of web applications operating within a web browser, comprising:
a processor;
a storage medium having computer program instructions stored thereon, wherein the computer program instructions, when executed by the processor, perform processing of:
a playback engine configured to receive a test script for testing a given web page and initiates loading of the given web page by a web browser, where the test script includes a plurality of actions for testing the given web page and is defined in accordance with a scripting language, wherein the playback engine is implemented as a browser extension of the web browser;
a monitoring agent having a tag embedded into a document object model of the given web page and is a script defined in accordance with the scripting language, where the monitoring agent determines a performance metric for the given web page during playback of the test script by the playback engine; and
a wait agent having a tag embedded into the markup language of the given web page and, during building of the document object model for the given web page, operates to inject the tag for the monitoring agent into the document object model for the given web page and pauses execution of other scripts embedded in the given web page until the tag for the monitoring agent has been injected into the document object model for the given web page, where the wait agent is a script defined in accordance with the scripting language;
wherein the monitoring agent receives the identifying information for the test script, appends the identifying information for the test script to an event message; and sends the event message to an event correlator, where the event message includes the performance metric and the event correlator resides on a monitoring node located remotely from the hosting computing device.

2. The computer-implemented system of claim 1 further comprises an injector agent that operates to inject the tag for the wait agent into the markup language of the given web page, where the injector agent is a script initiated by the playback engine and runs in the context of the web page.

3. The computer-implemented system of claim 1 wherein the wait agent determines whether the given web page is already instrumented with a real user monitoring agent and injecting the tag for the monitoring agent into the markup language for the given web page in response to a determination that the given web page is not already instrumented with a real user monitoring agent.

4. The computer-implemented system of claim 1 the monitoring agent is implemented by JavaScript code embedded in the markup language for the given web page.

5. The computer-implemented system of claim 1 wherein the wait agent injects a tag for a wrapper agent into the document object model for the given web page, where wrapper agent interacts with the playback engine to determine identifying information for the test script and passes the identifying information for the test script to the monitoring agent during playback of the test script by the playback engine.

6. The computer-implemented system of claim 5 wherein the identifying information for the test script includes an identifier for the test script, a name for a current script action and a sequence number of the current script action.

7. The computer-implemented system of claim 6 wherein the wrapper agent interacts with the playback engine via JavaScript files that run in context of given web page.

8. A computer-implemented method for synthetic testing of web applications operating in a web browser residing on a host computing device, comprising:

receiving, by a playback engine, a test script for testing a given web page from a data store, where the test script includes a plurality of actions for testing the given web page and is defined in accordance with a scripting language and where the playback engine is implemented as a browser extension of the web browser and executed by a processor of the host computing device;

loading, by the playback engine, the given web page by the web browser;

pausing, by the playback engine, execution of components embedded in the given web page, where the components are executed in a runtime environment supported by the web browser;

injecting, by the playback engine, a script tag for a monitoring agent into the document object model for the given web page, where monitoring agent determines a performance metric for the given web page during execution of the test script by the playback engine;

continuing, by the playback engine, execution of the components embedded in the given web page after injecting the script tag for the monitoring agent;

retrieving, by the playback engine, a given action from the plurality of actions which comprise the test script;

executing, by the playback engine, the given action on the given web page loaded by the web browser;

determining, by the monitoring agent, a performance metric for the given web page during execution of the test script by the playback engine;

sending, by the monitoring agent, an event message to an event correlator, where the event message includes the performance metric and the event correlator resides on a monitoring node located remotely from the hosting computing device interacting, by the monitoring agent, with the playback engine to determine identifying information for the test script; and appending, by the monitoring agent, the identifying information for the test script to the event message before sending the event message to the event correlator.

9. The method of claim 8 wherein the monitoring agent is implemented by JavaScript code embedded in markup language for the given web page.

10. The method of claim 8 wherein pausing the execution of components further comprises
injecting, by the playback engine, a wait agent into the document object model for the given web page, where a script tag for the wait agent is placed in the document object model before all other script tags in the document object model.

11. The method of claim 10 wherein loading the given web page further includes loading JavaScript code for the wait agent and for the monitoring agent.

12. The method of claim 11 wherein injecting a monitoring agent further comprises determining, by the wait agent, whether the given web page is instrumented with a real user monitoring agent; and
injecting, by the wait agent, a script tag for a synthetic monitoring agent into the document object model for the given web page, where the injection is in response to a determination that the given web page is not instrumented with a real user monitoring agent.

13. The method of claim 12 further comprises determining whether the given web page is instrumented with a real user monitoring agent by searching the document object model of the given web page for a script tag having a particular value.

* * * * *